H. H. JONES.
HACKSAW MACHINE.
APPLICATION FILED MAY 27, 1911.
1,088,284.
Patented Feb. 24, 1914.
2 SHEETS—SHEET 2.
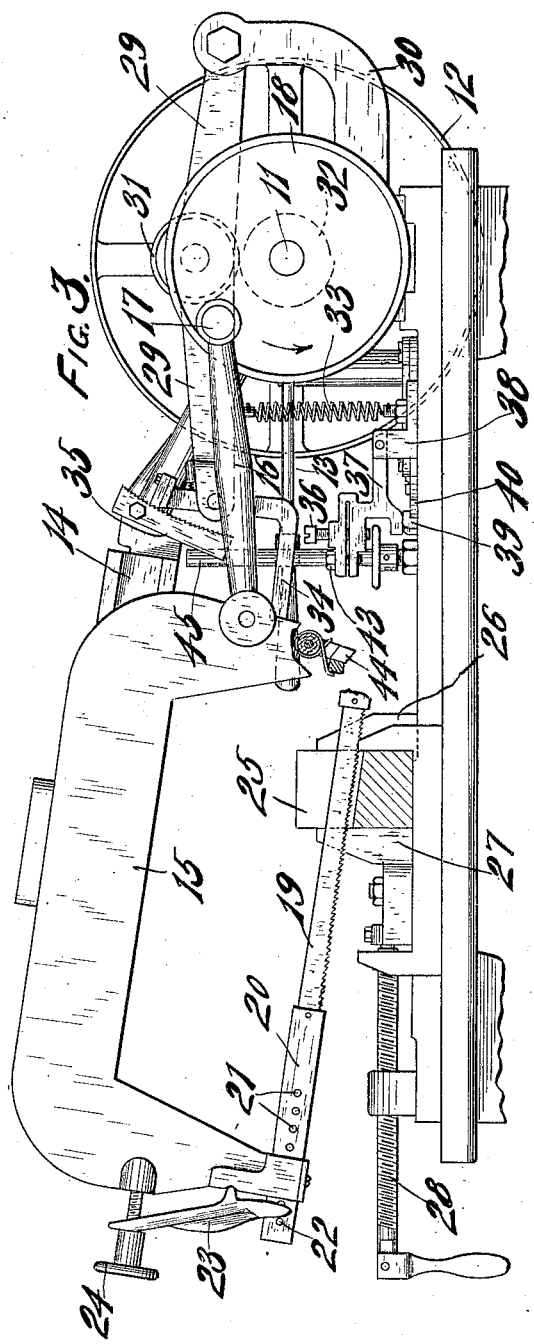
WITNESSES
INVENTOR.
Hugh H. Jones,
By Morrell & Caldwell
ATTORNEYS.

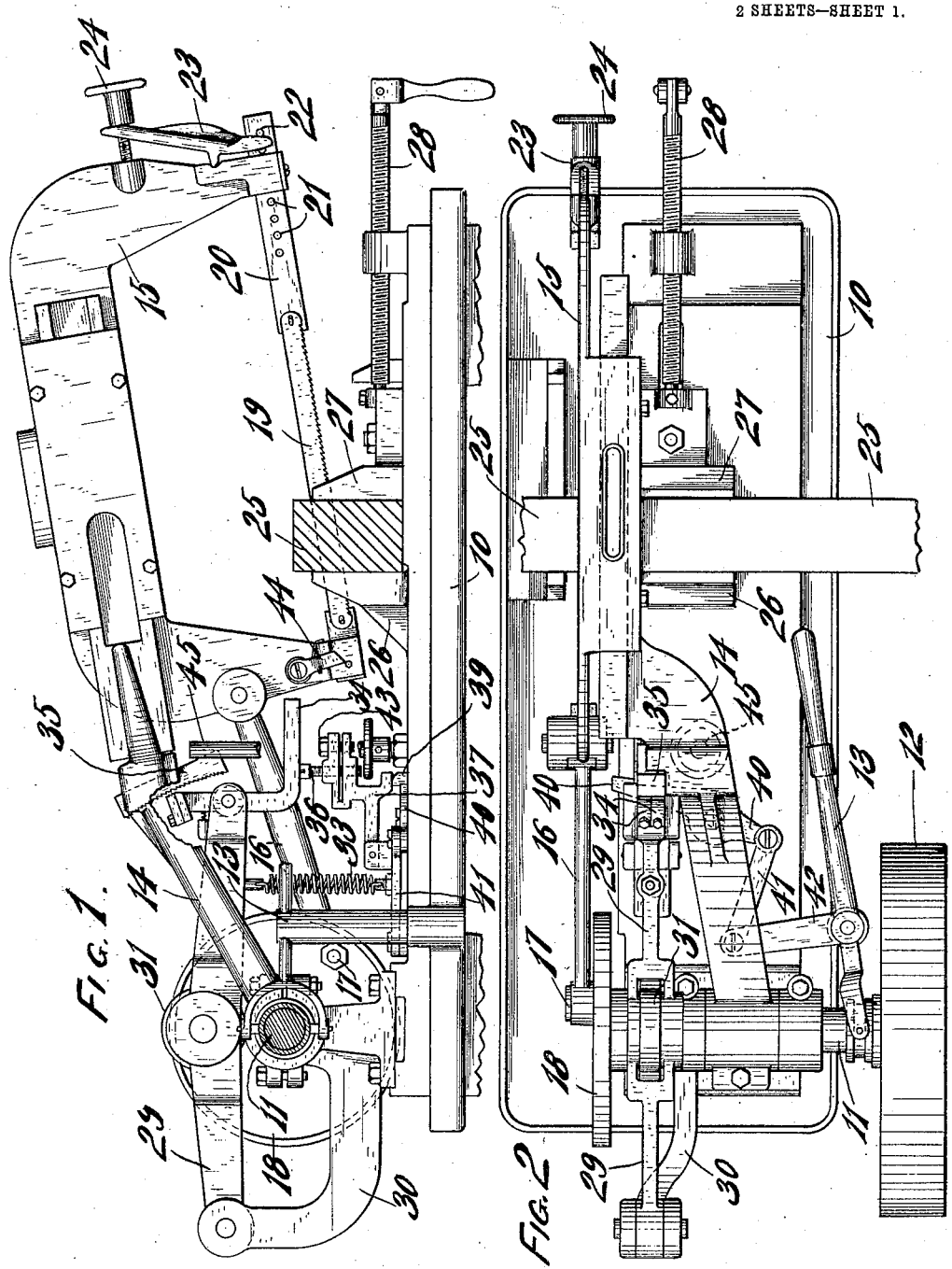

UNITED STATES PATENT OFFICE.

HUGH H. JONES, OF RACINE, WISCONSIN, ASSIGNOR TO RACINE TOOL AND MACHINE COMPANY, A CORPORATION OF WISCONSIN.

HACKSAW-MACHINE.

1,088,284. Specification of Letters Patent. Patented Feb. 24, 1914.

Application filed May 27, 1911. Serial No. 629,940.

*To all whom it may concern:*

Be it known that I, HUGH H. JONES, a citizen of the United States, and resident of Racine, in the county of Racine and State of Wisconsin, have invented new and useful Improvements in Hacksaw-Machines, of which the following is a description, reference being had to the accompanying drawings, which are a part of this specification.

This invention has for its object to provide a hack saw machine of the type of machine shown in the patent to Rasmussen No. 927,751 with an improved form of dog releasing means which will be more firmly held in place against accidental dislocation and which will afford a more effective means for clamping the adjustment screws which release the dogs.

Another object of the invention is to provide the saw frame with a saw tightener of novel construction.

With the above and other objects in view the invention consists in the improvements in hack saw machines herein claimed and all equivalents.

Referring to the accompanying drawings, in which like characters of reference indicate the same parts in the different views: Figure 1 is an elevation of one side of a hack saw machine embodying the improvements constituting this invention; Fig. 2 is a plan view thereof; Fig. 3 is a view similar to Fig. 1 viewing the machine from the other side; Fig. 4 is a detail plan view showing the dog releasing means and the tripping lever on which it rests when the machine is in operation; Fig. 5 is a detail view of these parts, the bed plate of the machine being sectioned transversely; Fig. 6 is a detail view of the saw blade tightener; and, Fig. 7 is a perspective view of the tripping lever.

In these drawings 10 indicates the bed plate of a hack saw machine, and 11 is the drive shaft mounted in bearings thereon and driven from some suitable source of power by means of a belt pulley 12 which is loosely mounted on the shaft and which may be coupled with it by means of a clutch lever 13. The bearings for the shaft also form a pivotal support for a swinging saw guide 14 on which is slidably mounted a saw frame 15 which is reciprocated by means of a connecting rod 16 connecting it with a wrist pin 17 on a crank disk 18 carried by the shaft.

A saw blade 19 is mounted in the saw frame with one end engaging the end of the saw frame and the other end engaging a rod 20 which slidably passes through the other end of the saw frame. The rod 20 is provided with a number of openings 21 through one of which a pin 22 may be passed to engage the bifurcated end of a saw tightening lever 23 which is fulcrumed on the end of the saw frame and is engaged by a hand nut 24 on the saw frame for causing it to swing to draw on the rod 20 and tighten the saw blade. The bed plate 10 is provided with a vise for holding the work 25 to be operated upon, said vise comprising a stationary jaw 26 and a slidable jaw 27, the latter being moved by means of a screw 28 as usual.

In order that the saw may be free on its return stroke so as to only bear upon the work during its forward stroke and thus relieve the saw teeth from unnecessary wear automatic lifting mechanism is provided. A lever 29 is fulcrumed on a bracket 30 and carries a roller 31 engaging a cam 32 on the shaft and is held in such engagement by a coil spring 33. On the end of this lever 29 a pair of angular dogs 34 are pivotally mounted, and at their hardened toothed upper ends they are pressed by springs into engagement with ratchet teeth on an arc-shaped rack 35 of the swinging saw guide 14, while their lower bent ends are in position to engage the heads of adjusting screws 36 in a dog releasing lever 37 which is pivotally mounted on a bracket 38 removably secured to the bed plate of the machine. That is to say, the lower ends of the dogs 34 may engage such adjusting screws when the dog releasing lever 37 is in its elevated operating position, which requires the presence of a supporting cam block 39 beneath it. The cam block is carried by a tripping lever 40 fulcrumed on the bed plate and connected by means of a link 41 with a crank arm 42 on the clutch lever 13.

When the clutch lever is thrown to the position for engaging the clutch and thus cause the machine to be driven, the cam block 39 is forced beneath the lower end of the dog releasing lever 37 to lift the same into its operative position. The drive shaft which is set in motion by the closing of the clutch, starts the saw in its reciprocating movement on the saw guide, and by means of the action of the cam 32 on the roller 31, the lever 29 is slightly raised at each return stroke of the saw and serves to lift with it the swinging saw frame 14 by reason of the engagement of the dogs 34 with the rack 35 of the saw frame and thus the saw is lifted enough to relieve it from engagement with the work during its return stroke. As soon as the forward stroke of the saw begins, the roller 31 by riding off of the cam 32 lowers the saw frame and the ends of the dogs 34 on coming into engagement with the heads of the adjusting screws 36 are swung thereby to release their engagement with the rack and allow the saw to rest its full weight on the work.

In order that the engagement of the dogs 34 with the rack of the saw guide may be assured at the beginning of the upward movement of lever 29, a pair of such dogs are provided and the engaging teeth of one dog are slightly higher than the engaging teeth of the other dog so that one dog or the other will be in position for immediate engagement. This mechanism requires accurate adjustment of the dog releasing means, and this is provided by the screws 36 which, when adjusted, may be readily clamped in their adjusted positions by the novel construction of the parts. The dog releasing lever 37 has its upper portion provided with a horizontal slot which extends from one end to near the other end thereof and the adjusting screws 36 thread into the metal above and below this slot, while a clamping screw 43 also crosses the slot, passing freely through the portion on one side of the slot to thread into the portion on the other side of the slot so that when the clamping screw is tightened, it serves to jam the threads of the dog releasing lever against the threads of the adjusting screws 36 and so prevent their losing their adjustments.

When the saw completes its cut through the work, the saw frame has descended to a level which will bring a spring pressed pivoted catch 44 thereon into a position where it will engage the projecting end of the tripping lever 40 and swing the same to the position shown in dotted lines in Fig. 4, thus removing the block 39 from beneath the dog releasing lever 37 and at the same time throwing out the clutch to stop the machine. The dog releasing lever is thus thrown out of its operative position and the dogs remain in engagement with the racks 35 so that whatever the position of the operating shaft, the saw frame may be raised or lowered without danger of its falling while adjusting the work for the next cut. In lifting the saw the dogs ride over the ratchet teeth like pawls, but for lowering the saw they are removed from the ratchet teeth by grasping the lower ends of the dogs and lowering them with one hand while the saw frame is lowered with the other hand. An adjustable stop post 45 on the bed plate 10 stands in position to engage the saw guide 14 and limit the downward movement of the saw to approximately the position at which it finishes the cut.

What I claim as new and desire to secure by Letters Patent is:

1. In a hack saw, a swinging saw guide, a reciprocating saw frame on the saw guide, a rack carried by the guide, a suitably operated lever, a dog on the lever to engage the rack for lifting the saw during the return movement thereof, and a lever fulcrumed in position to be engaged by the dog in its movement to lower the saw, and a tripping lever in the path of the saw and supporting the dog releasing lever, said tripping lever, when engaged by the saw, being removed from beneath the dog releasing lever to prevent the engagement of the dog releasing lever with the dog.

2. In a hack saw machine, a movable saw guide, a reciprocating saw mounted thereon, a rack carried by the saw guide, a cam operated lever, a dog on the lever engaging the rack for lifting the saw guide on the return stroke of the saw, a dog releasing lever having a slotted end, a screw threaded in the dog releasing lever across the slot with threaded engagement therewith on both sides of the slot and adapted in one position of the dog releasing lever to be engaged by the dog on the downward movement thereof for throwing it out of engagement with the rack, a clamping screw extending across the slot of the dog releasing lever for clamping the adjusting screw in its adjustments, a tripping lever in the path of the saw and adapted to be engaged and moved thereby when the saw has finished its cutting operation, said tripping lever in the operative position of the parts serving to support the dog releasing lever, but when moved by the saw from beneath the dog releasing lever permitting said dog releasing lever to drop out of its operative position, and a clutch for controlling the driving mechanism for the saw connected with the tripping lever and adapted to be thrown out of engagement when the tripping lever is moved by the saw.

3. In a hack saw machine, a movable saw guide, a reciprocating saw mounted thereon, a rack carried by the saw guide, a cam operated lever, a dog on the lever engaging the rack for lifting the saw guide on the return stroke of the saw, a dog releasing lever having a slotted end, a screw threaded in the dog releasing lever across the slot with threaded engagement therewith on both sides of the slot and adapted in one position of the dog releasing lever to be engaged by the dog on the downward movement thereof for throwing it out of engagement with the rack, a clamping screw extending across the slot of the dog releasing lever for clamping the adjusting screw in its adjustments, and a tripping lever supporting the dog releasing lever in the operative position of the parts and standing in the path of the saw to be engaged and moved thereby when the saw has finished its cutting operation to permit the dog releasing lever to move out of its operation position.

In testimony whereof, I affix my signature, in presence of two witnesses.

HUGH H. JONES.

Witnesses:
R. S. C. CALDWELL,
KATHERINE HOLT.

Copies of this patent may be obtained for five cents each, by addressing the "Commissioner of Patents, Washington, D. C."